United States Patent
Matturi et al.

(10) Patent No.: US 11,886,739 B2
(45) Date of Patent: Jan. 30, 2024

(54) READ OPERATION USING COMPRESSED MEMORY

(71) Applicant: Micron Technology, Inc., Boise, ID (US)

(72) Inventors: Venkata Kiran Kumar Matturi, Khammam (IN); Tushar Chhabra, Sri Ganganagar (IN); Sushil Kumar, Hyderabad (IN); Sharath Chandra Ambula, Mancherial (IN)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 17/144,573

(22) Filed: Jan. 8, 2021

(65) Prior Publication Data

US 2022/0222012 A1     Jul. 14, 2022

(51) Int. Cl.
*G06F 12/00* (2006.01)
*G06F 3/06* (2006.01)

(52) U.S. Cl.
CPC ............ *G06F 3/0659* (2013.01); *G06F 3/064* (2013.01); *G06F 3/0604* (2013.01); *G06F 3/0608* (2013.01); *G06F 3/0652* (2013.01); *G06F 3/0653* (2013.01); *G06F 3/0679* (2013.01)

(58) Field of Classification Search
CPC .... G06F 3/0659; G06F 3/0604; G06F 3/0608; G06F 3/064; G06F 3/0652; G06F 3/0653; G06F 3/0679
See application file for complete search history.

(56) References Cited

U.S. PATENT DOCUMENTS

| | | | | |
|---|---|---|---|---|
| 7,024,512 | B1* | 4/2006 | Franaszek | G06F 12/023 |
| | | | | 711/170 |
| 8,516,005 | B2* | 8/2013 | Ergan | G06F 12/08 |
| | | | | 707/802 |
| 2013/0091304 | A1* | 4/2013 | Naganuma | G06F 3/0608 |
| | | | | 709/238 |
| 2017/0060764 | A1* | 3/2017 | Shetty | G06F 12/126 |
| 2020/0159454 | A1* | 5/2020 | Takaoka | G06F 3/0689 |
| 2021/0286552 | A1* | 9/2021 | Shen | G06F 3/0631 |

* cited by examiner

*Primary Examiner* — Daniel D Tsui
(74) *Attorney, Agent, or Firm* — Holland & Hart LLP

(57) ABSTRACT

Methods, systems, and devices for a read operation using compressed memory are described. An apparatus may include a host system coupled with a non-volatile memory device and a volatile memory device. The host system may store, in the volatile memory device, a compressed copy of data stored in the non-volatile memory device, for example, based on a score assigned to the data. The host system may identify that the compressed copy of the data is stored in the volatile memory device and may transmit a read command to the volatile memory device that includes a logical address associated with a logical block address of the data stored in the non-volatile memory device. The host system may receive the compressed copy of the data from the volatile memory device in response to the read command and may decompress the data.

25 Claims, 7 Drawing Sheets

Used Pages

Cached Pages

Free Pages

Compressed Pages

READ OPERATION USING COMPRESSED MEMORY

FIELD OF TECHNOLOGY

The following relates generally to one or more systems for memory and more specifically to a read operation using compressed memory.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
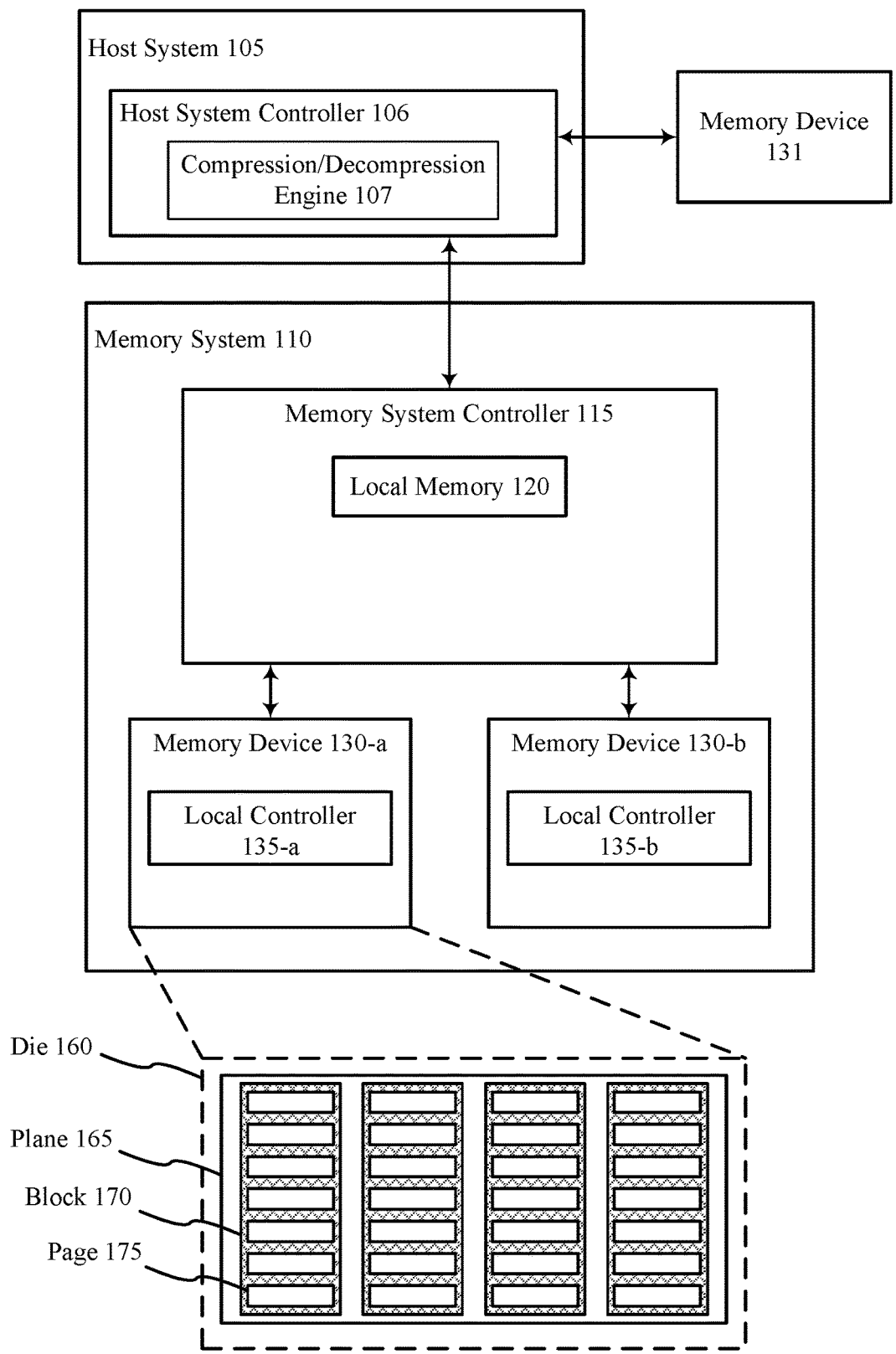
FIGS. 1 and 2 illustrate examples of systems that supports a read operation using compressed memory in accordance with examples as disclosed herein.

A memory system may include multiple types of memory devices for performing various functions. Each type of memory device may be associated with characteristics that are utilized to perform a respective function. For example, a volatile memory device (e.g., a random access memory (RAM) device, or another volatile memory device) may support fast access speeds, among other characteristics, and a non-volatile memory device (e.g., not-and (NAND) memory devices, or another non-volatile memory device) may support a large storage capacity that is maintained when electrical power is removed, among other characteristics. A host system may communicate with one or more volatile memory devices and one or more non-volatile memory devices, for example, to write data and to read data. In some cases, the host system may store hot data (e.g., data that is likely to be accessed or data that is frequently accessed) in a volatile memory device to enable faster access speeds of the hot data. In some cases, retrieving information from a non-volatile memory device (such as a NAND device) may take more time than retrieving information from a volatile memory device (such as a DRAM device). However, in some cases, the volatile memory device may have a reduced storage capacity compared to a non-volatile memory device, and the volatile memory device may not have enough available memory to store the hot data. As a result, the host system may store the hot data in a non-volatile memory device, which may increase latency associated with reading the hot data. Additionally, increasing volatile memory device storage capacity may increase cost and use additional space. Therefore, it may be desirable to increase an amount of data that may be written to a volatile memory device without increasing the storage capacity of the volatile memory device.

Techniques, systems, and devices are described herein for accessing a volatile memory device to read compressed copies of data that is also stored in a non-volatile memory device. For example, a volatile memory device may allocate a portion of the volatile memory device to store compressed copies of data stored in a non-volatile memory device. In some cases, the allocated portion may be referred to as compressed RAM (cRAM). A host system that is coupled with the volatile memory device and the non-volatile memory device may determine that data stored in the non-volatile memory device is accessed relatively frequently (e.g., it is 'hot' data) and store a compressed copy of the data in the cRAM. For example, the host system may determine to store the compressed copy of the data, retrieve the data from the non-volatile memory device based on the determination, compress the data, and store the compressed copy in the cRAM. The host system may determine to read the data and may identify that the compressed copy of the data is stored in the cRAM. The host system may transmit a read command to the volatile memory device that includes a logical address associated with a logical block address (LBA) of the data stored in the non-volatile memory device. The host system may receive the compressed copy of the data from the volatile memory device and decompress the data. Therefore, the host system may read the data from the volatile memory device instead of the non-volatile memory device if a compressed copy of the data is stored in the volatile memory device. In this way, because compressed data occupies less storage space than uncompressed data (e.g., 4 times less space, or some other smaller storage space), the host system may store additional data in the volatile memory device without risk of losing information (e.g., because the data is additionally stored in the non-volatile memory device), which may result in increased access speeds associated with accessing the data and reduced power consumption at the host system.

Features of the disclosure are initially described in the context of systems as described with reference to FIGS. 1 and 2. Features of the disclosure are described in the context storage schemes, timing diagrams, and process flows as described with reference to FIGS. 3 through 5. These and other features of the disclosure are further illustrated by and described with reference to an apparatus diagram and a flowchart that relate to a read operation using compressed memory as described with reference to FIGS. 6 and 7.

FIG. 1 is an example of a system 100 that supports a read operation using compressed memory in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static RAM (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive RAM (RRAM), oxide based RRAM (OxRAM), and electrically erasable programmable ROM (EEPROM). Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include a memory device 131, which may be coupled with the host system 105 (e.g., via a physical host interface, or some other interface). In some examples, this coupling may include an interface with the host system controller 106. In some examples, the memory device 131 may include one or more memory arrays of volatile memory cells, such as RAM memory cells.

The host system 105 may use the memory device 131 as a random access memory device, for example, to write data to the memory device 131 and read data from the memory device 131. The memory device 131 allocate a portion of the memory device 131 as cRAM (e.g., to store compressed copies of data stored in a non-volatile memory device). The host system 105 may store a compressed copy of data stored in a memory device 130-*a* in the cRAM of the memory device 131. For example, the host system 105 may determine to store the compressed copy of the data and may retrieve the data from the memory device 130-*a* based on the determination. The host system 105 may include a compression/decompression engine 107 (e.g., included in the host system controller 106) that may compress the data. The host system 105 may store the compressed copy in the cRAM. Additionally, or alternatively, the host system 105 may compress and write a copy of data to the cRAM concurrent with writing the data to the memory device 130-*a*. The host system 105 may determine to read the data and may identify that the compressed copy of the data is stored in the cRAM. The host system 105 may transmit a read command to the memory device 131 that includes a logical address associated with an LBA of the data stored in the memory device 130-*a*. The host system 105 may receive the compressed copy of the data from the memory device 131 and decompress the data using the compression/decompression engine 107. This approach may result increased access speeds associated with accessing the data, reduced power consumption, and may enable the host system 105 to store additional data in the memory device 131 (e.g., compared to storing uncompressed data in the memory device 131).

The system 100 may include any quantity of non-transitory computer readable media that support a read operation using compressed memory. For example, the host system 105, the memory system controller 115, or a memory device 130-*a* may include or otherwise may access one or more non-transitory computer readable media storing instructions (e.g., firmware) for performing the functions ascribed herein to the host system 105, memory system controller 115, or memory device 130-*a*. For example, such instructions, if executed by the host system 105 (e.g., by the host system controller 106), by the memory system controller 115, or by a memory device 130-*a* (e.g., by a local controller 135), may cause the host system 105, memory system controller 115, or memory device 130-*a* to perform one or more associated functions as described herein.

In some cases, a memory system 110 may utilize a memory system controller 115 to provide a managed memory system that may include, e.g., one or more memory arrays and related circuitry combined with a local (e.g., on-die or in-package) controller (e.g., local controller 135). An example of a managed memory system is an MNAND system.

Figure 2:
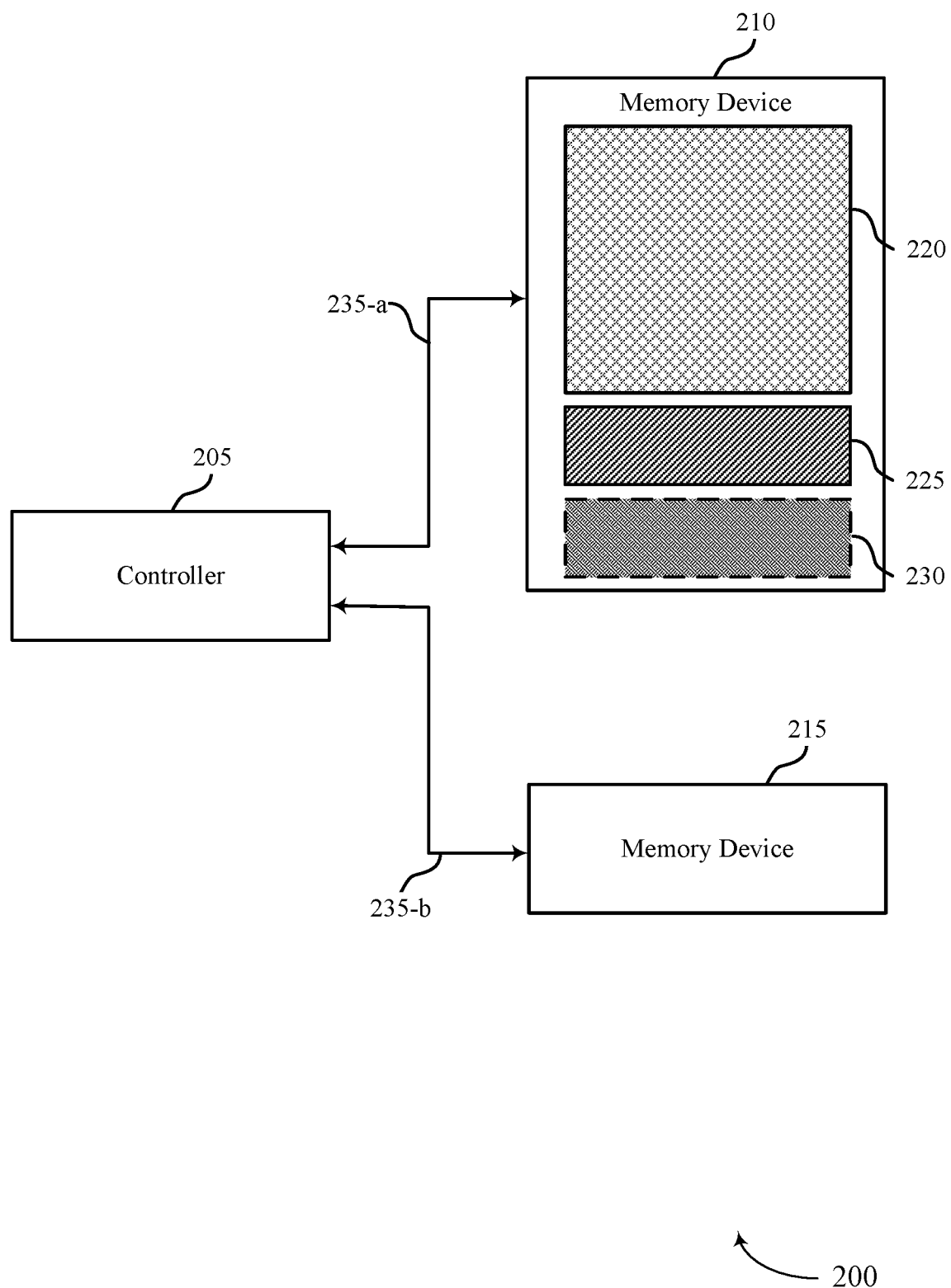

FIG. 2 illustrates an example of a system 200 that supports a read operation using compressed memory in accordance with examples as disclosed herein. The system 200 may be an example of a system 100 as described with reference to FIG. 1 or aspects thereof. For example, the system 200 may include a controller 205, a memory device 210, and a memory device 215, which may be examples of a host system controller 106, a memory device 131, and a memory device 130 as respectively described with reference to FIG. 1.

The controller 205 may be coupled with and communicate with the memory device 210 and the memory device 215 to perform operations such as access operations. For example, the controller 205 may be coupled with the memory device 210 via a conductive line 235-*a* and may be coupled with the memory device 215 via a conductive line 235-*b*. In some cases, the controller 205 may be included in or coupled with a host device (not shown). The memory device 210 may be an example of a volatile memory device, and the memory device 215 may be an example of a non-volatile memory device (e.g., a NAND device). In some examples, the memory device 210 may be associated with faster access speeds relative to the memory device 215, and the memory device 215 may be associated with increased storage capacity relative to the memory device 210.

In some cases, the controller 205 may store hot data (e.g., data that is likely to be accessed, data that is frequently accessed, or both) in the memory device 210 to enable faster access speeds of the hot data. However, in some cases, the memory device 210 may not have enough available memory to store the hot data. For example, the memory device 210 may store multiple types of data such as system data, application data, user data, cached data, and shared data, among other types of data, that may be associated with various operations performed by the memory device 210. In some cases, because the memory device 210 stores such data to perform associated operations, the memory device 210 may not have available memory to store the hot data. The controller may subsequently store the hot data in the memory device 215, which may increase latency associated with reading the hot data. For example, retrieving data from a non-volatile memory device may generally be slower than retrieving data from a volatile memory device. Thus, retrieving hot data stored in the memory device 215 may increase latency relative to retrieving hot data stored in the memory device 210. Additionally, increasing a storage capacity of the memory device 210 may increase cost and use additional space. Therefore, it may be desirable to increase an amount of data that may be written to the memory device 210 without increasing the storage capacity of the memory device 210.

To increase an amount of data that may be written to the memory device 210 and to decrease a number of read operations of the memory device 215, the memory device 210 may allocate a portion of the memory device 210 to store compressed data. For example, memory device 210 may allocate different portions of the memory device 210 for different purposes. For example, the memory device 210 may allocate a portion 220 to store uncompressed data of any data type and may allocate a portion 225 to store compressed copies of data stored in the memory device 215. In some examples, the memory device 210 may allocate a portion 230 to store compressed data of a subset of types of data (e.g., anonymous data, user data associated with a particular application, private user data), In some cases, the portion 230 may be referred to as zRAM. In some examples, the memory device 210 may allocate the portions 220, 225, 230, or a combination thereof, based on receiving an allocation command from the controller 205.

To store, in the portion 225, compressed copies of data stored in the memory device 215, the controller 205 may assign a score to data stored in the memory device 215. For example, data stored in the memory device 215 may be associated with an access frequency parameter. The access frequency parameter may indicate a likelihood that the data will be accessed, or a frequency that the data is accessed, or both. Based on the access frequency parameter, the controller 205 may assign a score to the data. The score may indicate whether the data is hot data. If the assigned score satisfies a threshold score (e.g., the data is hot data), the controller 205 may determine to store a compressed copy of the data in the memory device 210 (e.g., in the portion 225). The controller 205 may retrieve the data from the memory device 215 based on the score exceeding the threshold score, compress the data to generate the compressed copy of the data, and store the compressed copy of the data in the portion 225. In some examples, the controller 205 may generate a pointer that points to the compressed copy of the data based on storing the compressed copy of the data and store the pointer in the controller 205. The controller 205 may subsequently use the pointer to identify that the memory device 210 stores the compressed copy of the data.

Additionally or alternatively, the controller 205 may store compressed copies of data in the portion 225 concurrent with storing the data in the memory device 215. For example, the controller 205 may determine that data to be written to the memory device 215 is likely to be accessed by the controller 205 (e.g., video data, picture data, or other data likely to be accessed) and may compress and write copies of the data (e.g., to the portion 225) concurrent with writing the data to the memory device 215.

The controller 205 may read the compressed copy of the data stored in the memory device 210 instead of reading the data in the memory device 215. For example, the controller may determine to read the data stored in the memory device 215 and may identify that the memory device 210 stores the compressed copy of the data (e.g., based on the pointer stored in the controller 205). Based on identifying that the memory device 210 stores the compressed copy of the data, the controller 205 may transmit a read command that includes a logical address that is associated with the data to the memory device 210 instead of the memory device 215. The controller 205 may receive the compressed copy of the data from the volatile memory device and may decompress the data to read the data. Therefore, the controller 205 may reduce latency associated with reading the data.

In some examples, the controller 205 may determine to read second data stored in the memory device 215, where a compressed copy of the second data is not stored in the memory device 210. Here, the controller 205 may identify that the compressed copy of the second data is not stored in the memory device 210 and may transmit a read command to the memory device 215 to read the second data.

The controller 205 may update the score assigned to the data stored in the memory device 215. In some examples, the controller 205 may update the score assigned to the data based on transmitting the read command to the memory device 210. For example, the controller 205 may increase the score assigned to the data in response to the controller 205 accessing the compressed copy of the data. In some other examples, the controller 205 may update the score assigned to the data based on not accessing the compressed copy of the data for a time. For example, the controller 505 may periodically decrease the score assigned to the data if the controller 205 does not access the compressed copy of the data for a time. In some examples, the controller 205 may update the access frequency parameter associated with the data and may update the score assigned to the data based on updating the access frequency parameter.

The controller 205 may delete the compressed copy of the data stored in the memory device 210. For example, the score assigned to the data may is less than the threshold score (e.g., based on updating the score). The controller 205 may determine that the data is no longer hot data based on the score falling below the threshold score and may transmit a command to the memory device 210 to delete the compressed copy of the data. In some examples, the controller 205 may delete at least a portion of the compressed copy of the data by overwriting the portion of the compressed copy of the data. For example, the controller 205 may identify that second data stored in the memory device 215 is hot data. The controller may retrieve the second data from the memory device 215, compress the second data to generate a compressed copy of the second data, and store the compressed copy of the second data in the portion 225 by overwriting at least a portion of the compressed copy of the data with at least a portion of the compressed copy of the second data. Alternatively, the controller 205 may transmit a write command that includes a second LBA to store the second data in the memory device 215. The controller may generate the compressed copy of the second data and may store the compressed copy of the second data in the portion 225 concurrent with writing the second data to the memory device 210 by overwriting at least a portion of the compressed copy of the data with at least a portion of the compressed copy of the second data.

In some examples, the memory device 210 may reallocate the portions 220, 225, and 230. For example, the memory device 210 may determine that a threshold amount of memory of the portion 220 is used. The memory device 210 may reallocate at least a part of the portion 225, the portion 230, or a combination thereof, to the portion 220. Here, the score of the data may satisfy the threshold score for storing a compressed copy of the data in the portion 225, however, the memory device 210 may delete the compressed copy of the data and reallocate the part of the portion 225 to the portion 220 based on determining that the threshold amount of memory of the portion 220 is used. In some examples, the memory device 210 may reallocate at least a part of the portion 220, the portion 230, or a combination thereof, to the portion 225. For example, the memory device 210 may reallocate at least a part of the portion 220, the portion 230, or a combination thereof, to the portion 225 to store the additional compressed copies of data rather than delete, evict, or overwrite compressed copies of data stored in the portion 225 to store the additional compressed copies of data. In some cases, the memory device 210 may reallocate the portions 220, 225, or 230 based on receiving a reallocation command from the controller 205. For example, the controller 205 may determine that the threshold amount of memory of the portion 220 is used and transmit the reallocation command to the memory device 210. In some examples, the memory device 210 may reallocate the portions 220, 225, and 230 based on one or more operations to be performed by the memory device 210. For example, the memory device 210 may reallocate at least a part of the portions 220, 225, 230, or a combination thereof, to increase a respective allocation of the portion 220 or 225 in order to perform the one or more operations (e.g., access operations, cache operations, refresh operations, or some other operation).

In some examples, the controller 205 may store the compressed copy of the data in the memory device 215. For example, the controller 205 may determine to delete the compressed copy of the data stored in the memory device 210 (e.g., based on the score being less than the threshold score, based on reallocating a part of the portion 225 storing the compressed copy of the data) and may evict the compressed copy of the data. The controller 205 may store the evicted compressed copy of the data in the memory device 215, for example, to occupy to less memory of the memory device 215. In some cases, the controller 205 may delete the data stored in the memory device 215 after or concurrent with storing the compressed copy of the data in the memory device 215. The controller 205 may subsequently retrieve the compressed copy of the data from the memory device 215. For example, the controller 205 may transmit a read command to the memory device 215 that includes the logical address associated with the LBA of the data and may receive the compressed copy of the data from the memory device 215.

Figure 3:
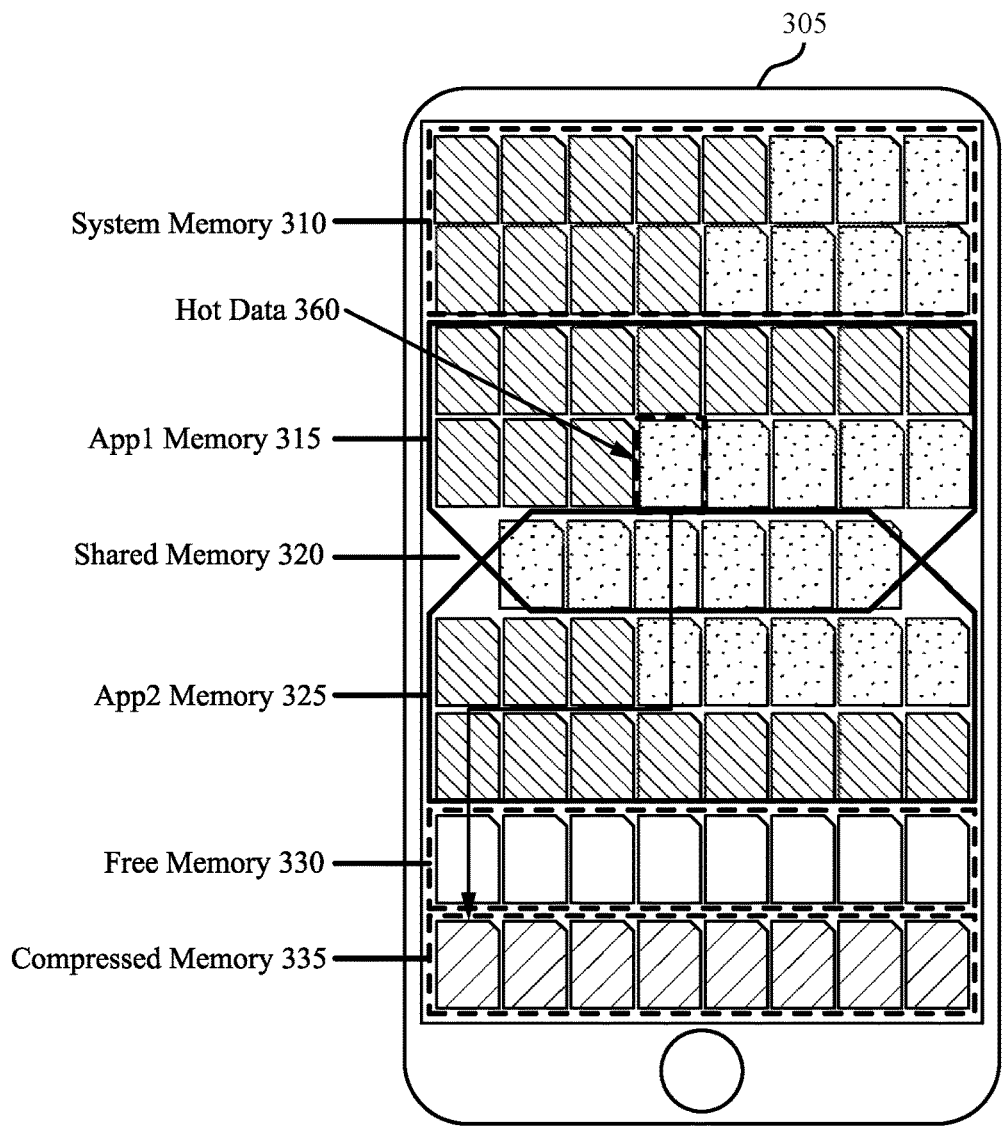
FIG. 3 illustrates an example of a storage scheme that supports a read operation using compressed memory in accordance with examples as disclosed herein.
Figure 3:
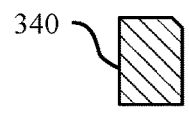
Figure 3:
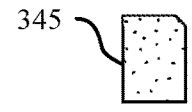
Figure 3:
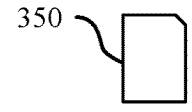
Figure 3:
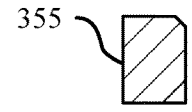

FIG. 3 illustrates an example of a storage scheme 300 that supports a read operation using compressed memory in accordance with examples as disclosed herein. The storage scheme 300 may implement aspects of a system 100. For example, the storage scheme 300 may be implemented by a memory device 305, which may be an example of a memory device 131 or a memory device 210 described with reference to FIGS. 1 and 2, respectively. The storage scheme 300 may be implemented to reduce latency and power consumption of a system including the memory device 305 and a host device, among other benefits.

The memory device 305 may include multiple memory arrays of volatile memory cells, such as RAM memory cells. In some examples, the memory device 305 may organize RAM memory cells into pages, which may be associated with a specific amount of memory (e.g., 4 kilobytes (KB) of memory, or some other amount of memory). A page may be associated with a type of page. For example, a page may be considered a used page 340, a cached page 345, a free page 350, or a compressed page 355 based on a type of data stored in the page. A used page 340 may include data that is actively used by the memory device 305. A cached page 345 may serve as a cache for a host device coupled with the memory device 305 or for the memory device 305. A free page 350 may be available to store data (e.g., may not currently store data). A compressed page 355 may store compressed copies of data that is stored in a non-volatile memory device. In some cases, a compressed page 355 may be reserved to store hot data 360 (e.g., data that is likely to be accessed by a host device, data that is frequently accessed by a host device).

The memory device 305 may organize or allocate groups of pages into blocks of memory. The memory device 305 may use different blocks of memory for different purposes. For example, the memory device 305 may allocate blocks of system memory 310, application 1 (App1) memory 315, shared memory 320, application 2 (App2) memory 325, free memory 330, and compressed memory 335. In some examples, the App1 memory block 315 may include used pages 340, or cached pages 345, or both, of data associated with a first application, the App2 memory block may include pages associated with used pages 340, or cached pages 345, or both, of data associated with a second application, the shared memory block 320 may include cached pages 345 of shared data between the first application and the second application. The free memory block 330 may include one or more free pages 350, and the compressed memory block 335 may include one or more compressed pages 355. The memory device 305 may allocate any number of pages to each block of memory.

The memory device 305 may compress data stored in a cached page 345 and store the compressed data in a compressed page 355 of the compressed memory block 335. For example, the memory device 305 may determine that a cached page 345 of the App1 memory block 315 stores hot data. The memory device 305 may compress the hot data stored in the cached page 345 and may store the hot data in the compressed page 355. In some examples, the data stored in the cached page 345 may also be stored in a non-volatile memory device. Therefore, the memory device 305 may store the compressed data in the compressed page 355 without risk of losing information.

Figure 4:
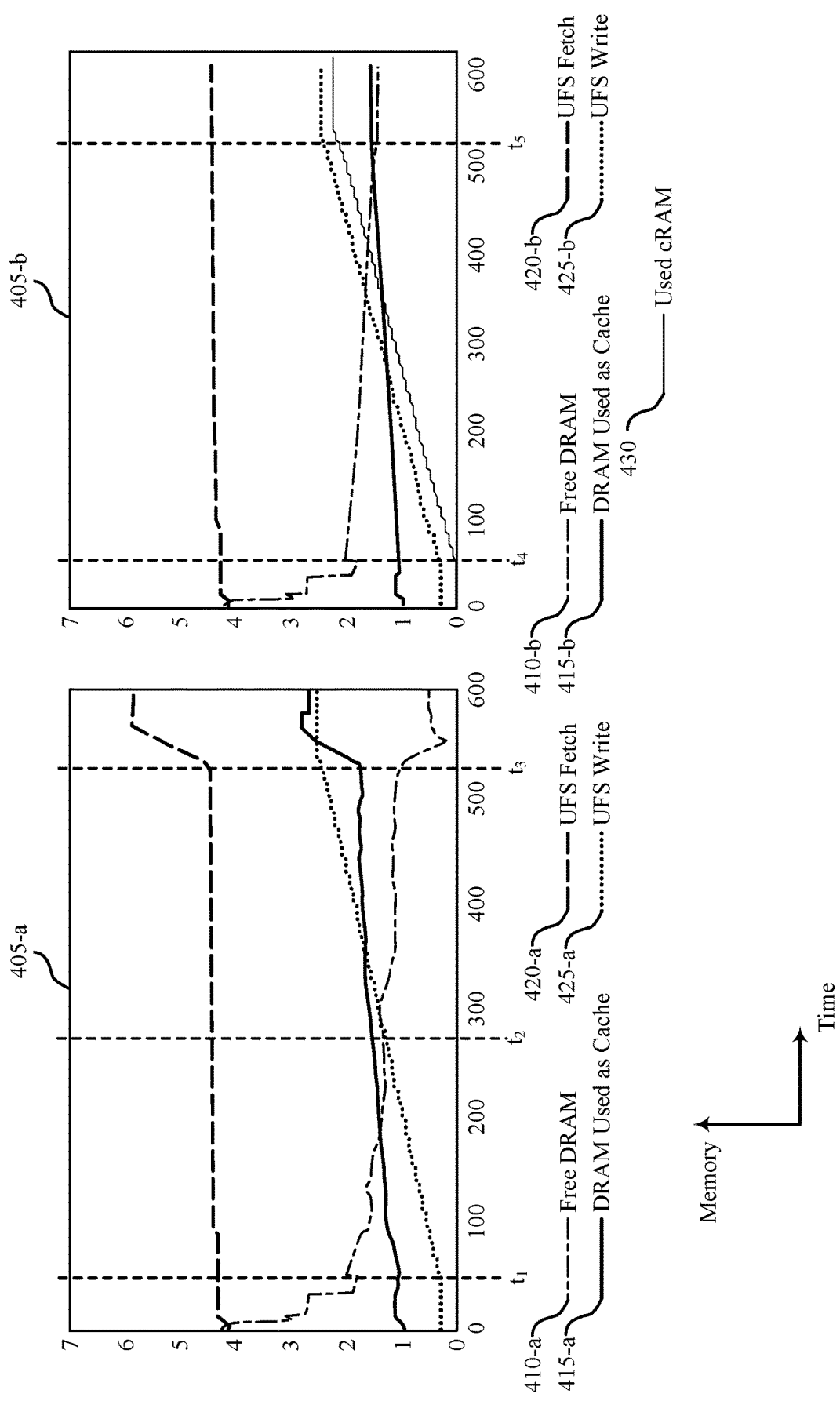
FIG. 4 illustrate examples of timing diagrams that support a read operation using compressed memory in accordance with examples as disclosed herein.

FIG. 4 illustrate examples of timing diagrams 405 that support a read operation using compressed memory in accordance with examples as disclosed herein. The timing diagrams 405 show various memory usages of associated with components of a system 100 or a system 200 as described with reference to FIGS. 1 and 2, respectively. For example, the timing diagram 405-a depicts an example memory usage of a non-volatile memory device (e.g., a UFS device) and a volatile memory device that does not include a cRAM allocation over time. The timing diagram 405-b depicts an example memory usage of the non-volatile memory device and a volatile memory device that does include a cRAM allocation over time.

The timing diagram 405-a may correspond to memory usage of memory devices when recording and subsequently accessing a video without using cRAM. For example, the timing diagram 405-a illustrates free DRAM 410-a (e.g., available DRAM) and DRAM used as cache 415-a when recording and subsequently accessing the video without using cRAM. Additionally, the timing diagram 405-a illustrates an amount of data fetched (e.g., read) from the UFS device (e.g., UFS fetch 420-a) and an amount of data written to the UFS device (e.g., UFS write 425-a) when recording and subsequently accessing the video without using cRAM.

At time t1, the video recording may begin. Between time $t_1$ and $t_3$ the host device may write video data to the UFS device according to the UFS write 425-a. Additionally, at time $t_1$, the host device may begin caching the video data in the DRAM according to DRAM used as cache 415-a. Accordingly, the free DRAM of the volatile memory device may decrease according to free DRAM 410-a. The host device may fetch data from the UFS device according to UFS fetch 420-a. In some cases, the host device fetching data from the UFS device prior to time $t_3$ may be associated with access operations that are not associated with the video data.

At time $t_2$, the volatile memory device may exhaust the DRAM available for caching the video data, and the DRAM used as cache 415-a may begin to flatten (i.e., the host device may discontinue caching the video data). In some cases, the volatile memory device may begin to flush (e.g., delete) the cached video data at time $t_2$. At time $t_3$, the video recording may end, and the host device may access the recorded video. Because the DRAM was unavailable to cache all of the video data, the host device may fetch the video data from the UFS device as shown in UFS fetch 420-a. In some cases, the volatile memory device may cache the fetched video data to create a video file (e.g., including the video data, a video title, a thumbnail, or any other video file information). Accordingly, the cached DRAM may increase at time $t_3$ according to DRAM used as cache 415-a and the free DRAM may decrease at time $t_3$ according to free DRAM 410-a. In some cases, fetching the video data from the UFS device and caching the video data at time $t_3$ may increase latency and increase power consumption (e.g., due to fetching and caching the video data) of a system that includes the host device, the volatile memory device, and the UFS device.

The timing diagram 405-b may correspond to memory usage of memory devices when recording and subsequently accessing a video using cRAM. For example, the timing diagram 405-b illustrates free DRAM 410-b (e.g., available DRAM), DRAM used as cache 415-b, and used cRAM 430 when recording and subsequently accessing the video without using cRAM. Additionally, the timing diagram 405-b illustrates an amount of data fetched (e.g., read) from the UFS device (e.g., UFS fetch 420-b) and an amount of data written to the UFS device (e.g., UFS write 425-b) when recording and subsequently accessing the video without using cRAM.

At time $t_4$, the video recording may begin. Between time $t_4$ and is the host device may write video data to the UFS device according to the UFS write 425-a. Additionally, the host device may compress the video data and write the compressed video data to the cRAM of the volatile memory device according to used cRAM 430. Because the host device writes the compressed data to the cRAM, the host device may reduce the amount of DRAM used as cache for the video data as shown in DRAM used as cache 415-b. Additionally, because the compressed video data occupies less space than uncompressed video data, the amount of free DRAM may increase as shown in free DRAM 410-b. The host device may fetch data from the UFS device according to UFS fetch 420-b between time $t_4$ and $t_5$.

At time t5, the video recording may end, and the host device may access the recorded video. The host device may determine that the compressed video data is stored in the cRAM and may retrieve the compressed video data from the cRAM. In this way, the host device may avoid fetching the video data from the UFS device and caching the fetched video data in the DRAM. This approach may reduce latency and power consumption of the system.

Figure 5:
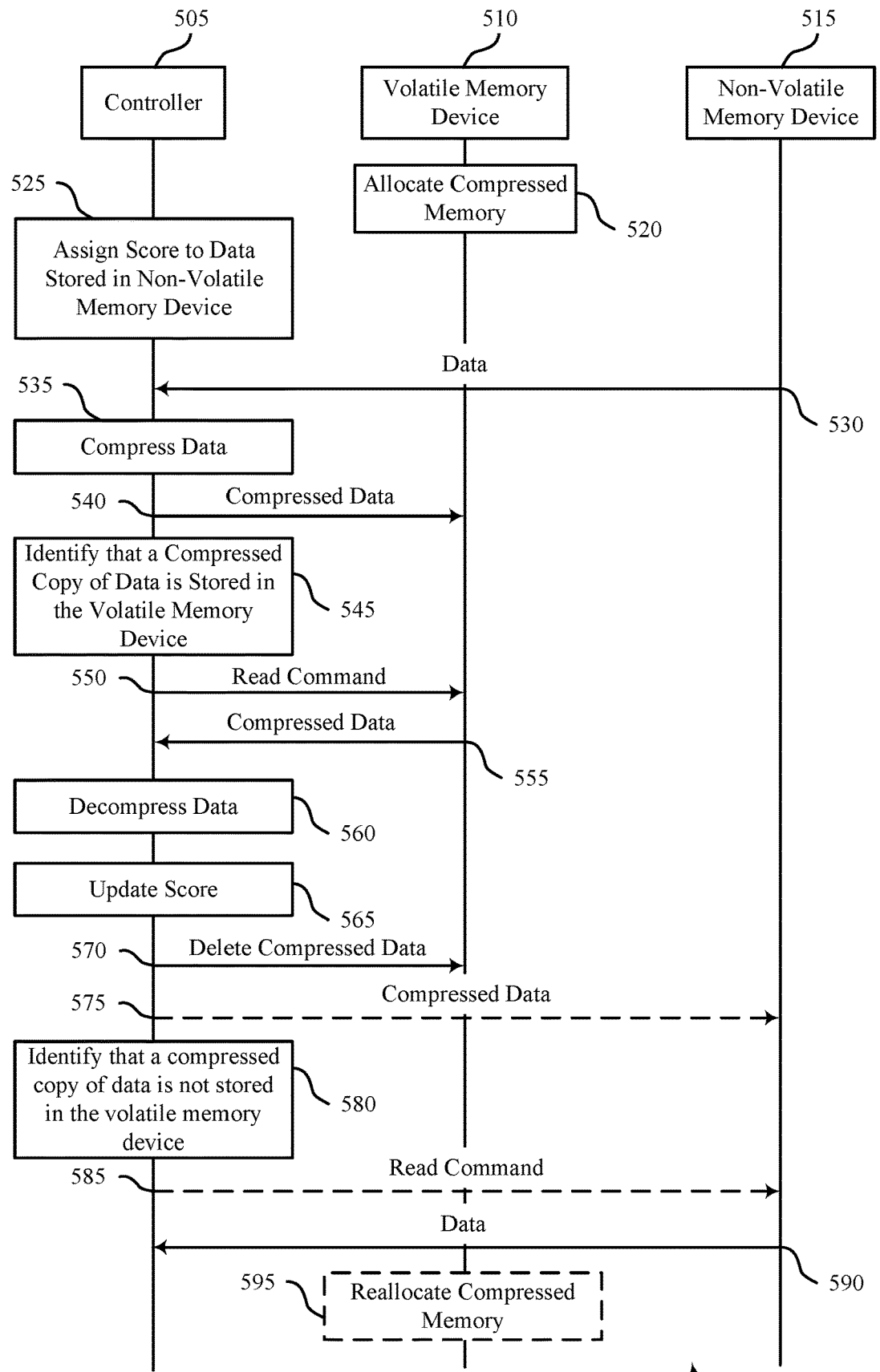
FIG. 5 illustrates an example of a process flow that supports a read operation using compressed memory in accordance with examples as disclosed herein.

FIG. 5 illustrates an example of a process flow 500 that supports a read operation using compressed memory in accordance with examples as disclosed herein. Aspects of the process flow 500 may be implemented by components of a system, such as systems 100 and 200 described with reference to FIGS. 1 and 2, respectively. For example, process flow 500 may be implemented by a controller 505, a volatile memory device 510, and a non-volatile memory device 515, which may be examples of a host system controller 106 or a controller 205, memory devices 131, 210, and memory devices 130, 215, as described with reference to FIGS. 1 and 2, respectively. Process flow 500 may be implemented to reduce latency and power consumption and increase system performance, among other benefits. Aspects of the process flow 500 may be implemented by a controller, among other components.

Additionally or alternatively, aspects of the process flow 500 may be implemented as instructions stored in memory (e.g., firmware stored in a memory coupled with the volatile memory device 510 and non-volatile memory device 515). For example, the instructions, if executed by a controller (e.g., the controller 205), may cause the controller to perform the operations of the process flow 500.

In the following description of the process flow 500, the operations may be performed in different orders or at different times. Some operations may also be omitted from the process flow 500, and other operations may be added to the process flow 500.

At 520, compressed memory may be allocated at the volatile memory device 510. For example, the volatile memory device 510 may allocate a portion of the volatile memory device for cRAM (e.g., to store compressed copies of data stored in the non-volatile memory device 515). In some cases, the volatile memory device 510 may allocate the portion based on a command from the controller 505 instructing the volatile memory device 510 to allocate the portion.

At 525, a score may be assigned to data stored in the non-volatile memory device 515. For example, the controller 505 may assign a score to data stored in the non-volatile memory device based on an access frequency parameter associated with the data. The access frequency parameter may indicate a likelihood that the data will be accessed, or a frequency that the data is accessed, or both. An access frequency parameter indicating frequently accessed data or data that is likely to be accessed may correspond to higher scores assigned to the data. For example, an access frequency parameter associated with video data of a recently recorded video may indicate that the video data is likely to be accessed. Accordingly, the controller 505 may assign a relatively high score to the video data. Conversely, an access frequency parameter indicating infrequently accessed data or data that is relatively less likely to be accessed may correspond to lower scores assigned to the data.

At 530, the data may be received from the non-volatile memory device 515. For example, if the score satisfies (e.g., is greater than) a threshold score, the controller 505 may determine that the data is hot data. The controller 505 may retrieve the data from the non-volatile memory device (e.g., by transmitting a read command to the non-volatile memory device associated with the data) based on the data being hot data.

At 535, the data may be compressed. For example, the controller 505 may compress the retrieved data to generate a compressed copy of the data stored in the non-volatile memory device 515.

At 540, the compressed copy of the data may be transmitted to the volatile memory device 510. For example, the controller 505 may transmit the compressed copy of the data to the volatile memory device 510 to store the compressed copy of the data in the volatile memory device 510 (e.g., in cRAM). In some examples, the controller 505 may create a pointer that points to the compressed copy of the data and may store the pointer at the controller 505.

At 545, the compressed copy of the data may be identified as being stored in the volatile memory device. For example, the controller 505 may determine to read the data stored in the non-volatile memory device 515. Prior to transmitting a read command to read the data from the non-volatile memory device, the controller 505 may identify that the compressed copy of the data is stored in the volatile memory device, for example, based on the stored pointer that points to the compressed copy of the data.

At 550, a read command may be sent to the volatile memory device. For example, the controller 505 may determine to read the compressed copy of the data stored in the volatile memory device 510 rather than read the data stored in the non-volatile memory device 515. Based on the determination to read the compressed copy of the data, the controller 505 may transmit, to the volatile memory device, a read command that includes a logical address that is associated with an LBA of the data stored in the non-volatile memory device.

At 555, the compressed copy of the data may be transmitted to the controller 505 from the volatile memory device 510. For example, the volatile memory device 510 may transmit the compressed copy of the data stored at the logical address to the controller 505 in response to receiving the read command.

At 560, the compressed copy of the data may be decompressed. For example, the controller 505 may receive the compressed copy of the data and may decompress the compressed copy of the data.

At 565, the score assigned to the data may be updated. For example, based on accessing the compressed copy of the data, the controller 505 may update (e.g., increase) the score assigned to the data. In some cases, the controller 505 may periodically decrease the score assigned to the data if the controller 505 does not access the compressed copy of the data for a time.

At 570, a delete command associated with the compressed copy of the data may be transmitted to the volatile memory device 510. For example, the controller 505 may determine that the data is no longer hot data and may transmit the delete command to delete the compressed copy of the data from the volatile memory device 510. In some examples, the controller 505 may delete the compressed copy of the data if the score assigned to the data falls below the threshold score.

At 575, the compressed copy of the data may optionally be transmitted to the non-volatile memory device 515. For example, the controller 505 may evict the compressed copy of the data from the volatile memory device 510 based on the score assigned to the data falling below the threshold score. The controller 505 may store the compressed copy of the data in the non-volatile memory device 515, for example, to occupy less memory of the non-volatile memory device 515. In some cases, the controller 505 may delete the data stored in the non-volatile memory device 515 after storing the compressed copy of the data.

At 580, the compressed copy of the data may be identifies as not being stored in the volatile memory device 510. For example, the controller 505 may determine to read the data stored in the non-volatile memory device 515. Based on deleting the compressed copy of the data, the controller 505 may identify that the compressed copy of the data is not stored in the volatile memory device 510.

At 585, a read command associated with the data may be transmitted to the non-volatile memory device 515. For example, based on identifying that the compressed copy of the data is not stored in the volatile memory device 510, the controller 505 may transmit a read command to the non-volatile memory device 515 that includes the logical address that is associated with the LBA of the data stored in non-volatile memory device 515.

At 590, the data may be received from the non-volatile memory device 515. For example, non-volatile memory device 515 may transmit the data to the controller 505 based on receiving the read command. In some cases, if the data stored is a compressed copy of the data, the non-volatile memory device 515 may transmit the compressed copy of the data.

At 595, at least a part of the compressed memory of the volatile memory device 510 may optionally be reallocated. For example, the volatile memory device 510 may determine that a threshold amount of memory of a second portion of the volatile memory device 510 used to store uncompressed data is used. As a result, the volatile memory device 510 may reallocate at least a part of the portion of the volatile memory device to the second portion. Because the portion of the volatile memory device 510 stores compressed copies of data stored in the non-volatile memory device 515, the volatile memory device 510 may reallocate the portion without transmitting any data stored in the portion to the non-volatile memory device 515.

Figure 6:
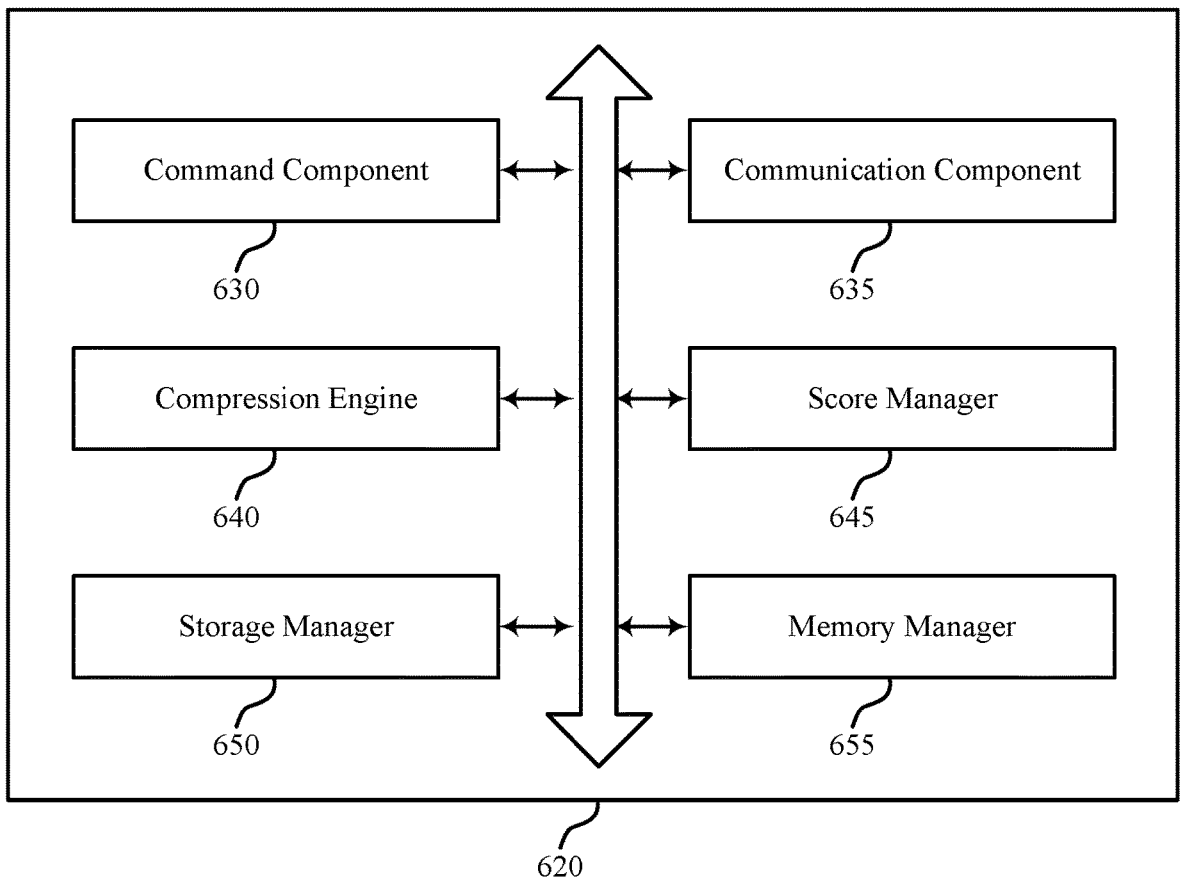
FIG. 6 shows a block diagram of a host system that supports a read operation using compressed memory in accordance with examples as disclosed herein.

FIG. 6 shows a block diagram 600 of a host system 620 that supports a read operation using compressed memory in accordance with examples as disclosed herein. The host system 620 may be an example of aspects of a host system as described with reference to FIGS. 1 through 5. The host system 620, or various components thereof, may be an example of means for performing various aspects of a read operation using compressed memory as described herein. For example, the host system 620 may include a command component 630, a communication component 635, a compression engine 640, a score manager 645, a storage manager 650, a memory manager 655, or any combination thereof. Each of these components may communicate, directly or indirectly, with one another (e.g., via one or more buses).

The command component 630 may be configured as or otherwise support a means for transmitting, to a volatile memory device coupled with the host system, a read command that includes a logical address that is associated with an LBA of data stored in a non-volatile memory device coupled with the host system. The communication component 635 may be configured as or otherwise support a means for receiving, from the volatile memory device, a compressed copy of the data associated with the LBA stored in the volatile memory device.

In some examples, the compression engine 640 may be configured as or otherwise support a means for decompressing the compressed copy of the data stored in the volatile memory device based at least in part on receiving the compressed copy of the data stored in the volatile memory device.

In some examples, the command component 630 may be configured as or otherwise support a means for identifying that the compressed copy of the data is stored in the volatile memory device, where transmitting the read command to the volatile memory device is based at least in part on identifying that the compressed copy of the data is stored in the volatile memory device.

In some examples, the score manager 645 may be configured as or otherwise support a means for assigning a score to the data based at least in part on an access frequency parameter associated with the data. In some examples, the storage manager 650 may be configured as or otherwise support a means for storing the compressed copy of the data in the volatile memory device based at least in part on the score satisfying a threshold score, where identifying that the compressed copy of the data is stored in the volatile memory device is based at least in part on storing the compressed copy of the data.

In some examples, the command component 630 may be configured as or otherwise support a means for retrieving the data from the non-volatile memory device based at least in part on the score exceeding the threshold score. In some examples, the compression engine 640 may be configured as or otherwise support a means for compressing the data to generate the compressed copy of the data based at least in part on retrieving the data, where storing the compressed copy of the data is based at least in part on compressing the data.

In some examples, the access frequency parameter includes an indication of a likelihood that the data is accessed, a frequency that the data is accessed, or a combination thereof.

In some examples, the score manager 645 may be configured as or otherwise support a means for identifying a score associated with the data stored in the non-volatile memory device based at least in part on an access frequency parameter associated with the data. In some examples, the storage manager 650 may be configured as or otherwise support a means for deleting the compressed copy of the data stored in the volatile memory device based at least part on the score being less than a threshold score.

In some examples, the command component 630 may be configured as or otherwise support a means for transmitting, from the host system, a write command that includes a second LBA to store second data in the non-volatile memory device. In some examples, the storage manager 650 may be configured as or otherwise support a means for storing a compressed copy of the second data in the volatile memory device by overwriting at least a portion of the compressed copy of the data with at least a portion of the compressed copy of the second data based at least in part on transmitting the write command.

In some examples, the score manager 645 may be configured as or otherwise support a means for updating a score associated with the data based at least in part on receiving the read command.

In some examples, the memory manager 655 may be configured as or otherwise support a means for allocating a portion of the volatile memory device to store compressed copies of data stored in the non-volatile memory device, the portion of the volatile memory device configured to provide low-latency access to the compressed copies of data, where receiving the compressed copy of the data stored in the volatile memory device is based at least in part on allocating the portion.

In some examples, the memory manager 655 may be configured as or otherwise support a means for determining that a threshold amount of memory of a second portion of the volatile memory device used to store uncompressed data is used. In some examples, the memory manager 655 may be configured as or otherwise support a means for reallocating at least a part of the portion of the volatile memory device to the second portion based at least in part on determining that the threshold amount of memory is used.

In some examples, the command component 630 may be configured as or otherwise support a means for identifying that a compressed copy of second data stored in the non-volatile memory device is not stored in the volatile memory device. In some examples, the command component 630 may be configured as or otherwise support a means for transmitting, to the non-volatile memory device, a second read command that includes a second logical address that is associated with a second LBA of the second data. In some examples, the communication component 635 may be configured as or otherwise support a means for receiving the second data from the non-volatile memory device based at least in part on transmitting the second read command to the non-volatile memory device.

In some examples, the storage manager 650 may be configured as or otherwise support a means for evicting the compressed copy of the data from the volatile memory device based at least in part on a score associated with the data stored in the non-volatile memory device being less than a threshold score. In some examples, the storage manager 650 may be configured as or otherwise support a means for storing the compressed copy of the data in the non-volatile memory device based at least in part on evicting the compressed copy of the data from the volatile memory device.

In some examples, the command component 630 may be configured as or otherwise support a means for identifying that the compressed copy of the data is not stored in the volatile memory device based at least in part on evicting the compressed copy of the data from the volatile memory device. In some examples, the command component 630 may be configured as or otherwise support a means for transmitting, to the non-volatile memory device, a second read command that includes the logical address that is associated with the LBA of the data stored in the non-volatile memory device. In some examples, the communication component 635 may be configured as or otherwise support a means for receiving the compressed copy of the data stored in the non-volatile memory device based at least in part on storing the compressed copy of the data in the non-volatile memory device.

In some examples, to support volatile memory device, the memory manager 655 may be configured as or otherwise support a means for a first portion of RAM cells configured to store uncompressed data of any data type. In some examples, to support volatile memory device, the memory manager 655 may be configured as or otherwise support a means for a second portion of RAM cells configured to store compressed data of a first type of data. In some examples, to support volatile memory device, the memory manager 655 may be configured as or otherwise support a means for a third portion of RAM cells configured to store compressed copies of host data stored by the non-volatile memory device, where the compressed copy of the data is stored in the third portion.

In some examples, the non-volatile memory device includes NAND memory cells, and the volatile memory device includes RAM cells.

Figure 7:
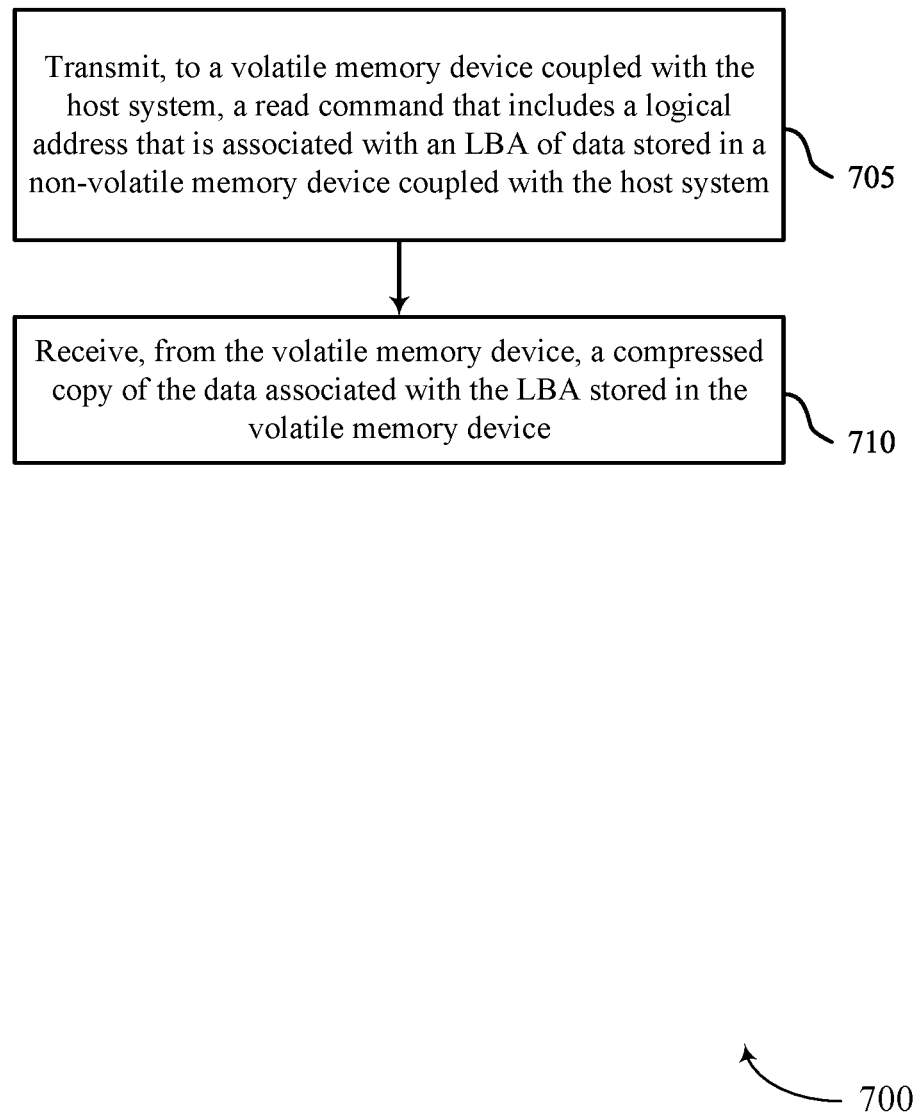
FIG. 7 shows a flowchart illustrating a method or methods that support a read operation using compressed memory in accordance with examples as disclosed herein.

FIG. 7 shows a flowchart illustrating a method 700 that supports a read operation using compressed memory in accordance with examples as disclosed herein. The operations of method 700 may be implemented by a host system or its components as described herein. For example, the operations of method 700 may be performed by a host system as described with reference to FIGS. 1 through 6. In some examples, a host system may execute a set of instructions to control the functional elements of the device to perform the described functions. Additionally or alternatively, the host system may perform aspects of the described functions using special-purpose hardware.

At 705, the method may include transmitting, to a volatile memory device coupled with the host system, a read command that includes a logical address that is associated with an LBA of data stored in a non-volatile memory device coupled with the host system. The operations of 705 may be performed in accordance with examples as disclosed herein. In some examples, aspects of the operations of 705 may be performed by a command component 630 as described with reference to FIG. 6.

At 710, the method may include receiving, from the volatile memory device, a compressed copy of the data associated with the LBA stored in the volatile memory device. The operations of 710 may be performed in accordance with examples as disclosed herein. In some examples, aspects of the operations of 710 may be performed by a communication component 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for transmitting, to a volatile memory device coupled with the host system, a read command that includes a logical address that is associated with an LBA of data stored in a non-volatile memory device coupled with the host system and receiving, from the volatile memory device, a compressed copy of the data associated with the LBA stored in the volatile memory device.

Some examples of the method 700 and the apparatus described herein may further include operations, features, circuitry, logic, means, or instructions for decompressing the compressed copy of the data stored in the volatile memory device based at least in part on receiving the compressed copy of the data stored in the volatile memory device.

Some examples of the method 700 and the apparatus described herein may further include operations, features, circuitry, logic, means, or instructions for identifying that the compressed copy of the data may be stored in the volatile memory device, where transmitting the read command to the volatile memory device may be based at least in part on identifying that the compressed copy of the data may be stored in the volatile memory device.

Some examples of the method 700 and the apparatus described herein may further include operations, features, circuitry, logic, means, or instructions for assigning a score to the data based at least in part on an access frequency parameter associated with the data and storing the compressed copy of the data in the volatile memory device based at least in part on the score satisfying a threshold score, where identifying that the compressed copy of the data may be stored in the volatile memory device may be based at least in part on storing the compressed copy of the data.

Some examples of the method 700 and the apparatus described herein may further include operations, features, circuitry, logic, means, or instructions for retrieving the data from the non-volatile memory device based at least in part on the score exceeding the threshold score and compressing the data to generate the compressed copy of the data based at least in part on retrieving the data, where storing the compressed copy of the data may be based at least in part on compressing the data.

In some examples of the method 700 and the apparatus described herein, the access frequency parameter includes an indication of a likelihood that the data may be accessed, a frequency that the data may be accessed, or a combination thereof.

Some examples of the method 700 and the apparatus described herein may further include operations, features, circuitry, logic, means, or instructions for identifying a score associated with the data stored in the non-volatile memory device based at least in part on an access frequency parameter associated with the data and deleting the compressed copy of the data stored in the volatile memory device based at least in part on the score being less than a threshold score.

Some examples of the method 700 and the apparatus described herein may further include operations, features, circuitry, logic, means, or instructions for transmitting, from the host system, a write command that includes a second LBA to store second data in the non-volatile memory device and storing a compressed copy of the second data in the volatile memory device by overwriting at least a portion of the compressed copy of the data with at least a portion of the compressed copy of the second data based at least in part on transmitting the write command.

Some examples of the method 700 and the apparatus described herein may further include operations, features, circuitry, logic, means, or instructions for updating a score associated with the data based at least in part on receiving the read command.

Some examples of the method 700 and the apparatus described herein may further include operations, features, circuitry, logic, means, or instructions for allocating a portion of the volatile memory device to store compressed copies of data stored in the non-volatile memory device, the portion of the volatile memory device configured to provide low-latency access to the compressed copies of data, where receiving the compressed copy of the data stored in the volatile memory device may be based at least in part on allocating the portion.

Some examples of the method 700 and the apparatus described herein may further include operations, features, circuitry, logic, means, or instructions for determining that a threshold amount of memory of a second portion of the volatile memory device used to store uncompressed data may be used and reallocating at least a part of the portion of the volatile memory device to the second portion based at least in part on determining that the threshold amount of memory may be used.

Some examples of the method 700 and the apparatus described herein may further include operations, features, circuitry, logic, means, or instructions for identifying that a compressed copy of second data stored in the non-volatile memory device may be not stored in the volatile memory device, transmitting, to the non-volatile memory device, a second read command that includes a second logical address that may be associated with a second LBA of the second data, and receiving the second data from the non-volatile memory device based at least in part on transmitting the second read command to the non-volatile memory device.

Some examples of the method 700 and the apparatus described herein may further include operations, features, circuitry, logic, means, or instructions for evicting the compressed copy of the data from the volatile memory device based at least in part on a score associated with the data stored in the non-volatile memory device being less than a threshold score and storing the compressed copy of the data in the non-volatile memory device based at least in part on evicting the compressed copy of the data from the volatile memory device.

Some examples of the method 700 and the apparatus described herein may further include operations, features, circuitry, logic, means, or instructions for identifying that the compressed copy of the data may be not stored in the volatile memory device based at least in part on evicting the compressed copy of the data from the volatile memory device, transmitting, to the non-volatile memory device, a second read command that includes the logical address that may be associated with the LBA of the data stored in the non-volatile memory device, and receiving the compressed copy of the data stored in the non-volatile memory device based at least in part on storing the compressed copy of the data in the non-volatile memory device.

In some examples of the method 700 and the apparatus described herein, the volatile memory device may include operations, features, circuitry, logic, means, or instructions for a first portion of RAM cells configured to store uncompressed data of any data type, a second portion of RAM cells configured to store compressed data of a first type of data, and a third portion of RAM cells configured to store compressed copies of host data stored by the non-volatile memory device, where the compressed copy of the data may be stored in the third portion.

In some examples of the method 700 and the apparatus described herein, the non-volatile memory device includes NAND memory cells, and the volatile memory device includes RAM cells.

It should be noted that the methods described above describe possible implementations, and that the operations and the steps may be rearranged or otherwise modified and that other implementations are possible. Further, portions from two or more of the methods may be combined.

An apparatus is described. The apparatus may include a host system coupled with a non-volatile memory device and a volatile memory device, a controller coupled with the host system and operable to cause the apparatus to, transmit, to the volatile memory device, a read command that includes a logical address that is associated with an LBA of data stored in the non-volatile memory device, and receive, at the host system from the volatile memory device, a compressed copy of the data stored at the logical address of the volatile memory device In some examples of the apparatus, the controller may be further configured to cause the apparatus to decompress the compressed copy of the data stored in the volatile memory device based at least in part on receiving the compressed copy of the data stored in the volatile memory device.

In some examples of the apparatus, the controller may be further configured to cause the apparatus to identify that the compressed copy of the data may be stored in the volatile memory device, where transmitting the read command to the volatile memory device may be based at least in part on identifying that the compressed copy of the data may be stored in the volatile memory device.

In some examples of the apparatus, the controller may be further configured to cause the apparatus to assign a score to the data based at least in part on an access frequency parameter associated with the data and store the compressed copy of the data in the volatile memory device based at least in part on the score satisfying a threshold score, where receiving the compressed copy of the data stored in the volatile memory device may be based at least in part on storing the compressed copy of the data.

In some examples of the apparatus, the controller may be further configured to cause the apparatus to retrieve the data from the non-volatile memory device based at least in part on the score exceeding the threshold score and compress the data to generate the compressed copy of the data based at least in part on retrieving the data, where storing the compressed copy of the data may be based at least in part on compressing the data.

In some examples of the apparatus, the access frequency parameter includes an indication of a likelihood that the data may be accessed, a frequency that the data may be accessed, or a combination thereof.

In some examples of the apparatus, the controller may be further configured to cause the apparatus to identify a score associated with the data stored in the non-volatile memory device based at least in part on an access frequency parameter associated with the data and delete the compressed copy of the data stored in the volatile memory device based at least part on the score being less than a threshold score.

In some examples of the apparatus, the controller may be further configured to cause the apparatus to transmit, from the host system, a write command that includes a second LBA to store second data in the non-volatile memory device and store a compressed copy of the second data in the volatile memory device by overwriting at least a portion of the compressed copy of the data with at least a portion of the compressed copy of the second data based at least in part on transmitting the write command.

In some examples of the apparatus, the controller may be further configured to cause the apparatus to update a score associated with the data based at least in part on receiving the read command.

In some examples of the apparatus, the controller may be further configured to cause the apparatus to allocate a portion of the volatile memory device to store compressed copies of data stored in the non-volatile memory device, the portion of the volatile memory device configured to provide low-latency access to the compressed copies of data, where receiving the compressed copy of the data stored in the volatile memory device may be based at least in part on allocating the portion.

In some examples of the apparatus, the controller may be further configured to cause the apparatus to determine that a threshold amount of memory of a second portion of the volatile memory device used to store uncompressed data may be used and reallocate at least a part of the portion of the volatile memory device to the second portion based at least in part on determining that the threshold amount of memory may be used.

In some examples of the apparatus, the controller may be further configured to cause the apparatus to identify that a compressed copy of second data stored in the non-volatile memory device may be not stored in the volatile memory device, transmit, to the non-volatile memory device, a second read command that includes a second logical address that may be associated with a second LBA of the second data, and receive the second data from the non-volatile memory device based at least in part on transmitting the second read command to the non-volatile memory device.

In some examples of the apparatus, the controller may be further configured to cause the apparatus to evict the compressed copy of the data from the volatile memory device based at least in part on a score associated with the data stored in the non-volatile memory device being less than a threshold score and store the compressed copy of the data in the non-volatile memory device based at least in part on evicting the compressed copy of the data from the volatile memory device.

In some examples of the apparatus, the controller may be further configured to cause the apparatus to identify that the compressed copy of the data may be not stored in the volatile memory device based at least in part on evicting the compressed copy of the data from the volatile memory device, transmit, to the non-volatile memory device, a second read command that includes the logical address that may be associated with the LBA of the data stored in the non-volatile memory device, and receive the compressed copy of the data stored in the non-volatile memory device based at least in part on storing the compressed copy of the data in the non-volatile memory device.

In some examples of the apparatus, the volatile memory device includes a first portion of RAM cells configured to store uncompressed data of any data type, a second portion of RAM cells configured to store compressed data of a first type of data, and a third portion of RAM cells configured to store compressed copies of host data stored by the non-volatile memory device, where the compressed copy of the data may be stored in the third portion.

In some examples of the apparatus, the non-volatile memory device NAND memory cells, and the volatile memory device includes RAM cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
    a host system coupled with a non-volatile memory device and a volatile memory device; and
    a controller coupled with the host system and operable to cause the apparatus to:
        receive a command to access data stored in the non-volatile memory device;
        determine whether a compressed copy of the data is additionally stored in the volatile memory device, the compressed copy of data associated with a logical block address (LBA) of the non-volatile memory device based at least in part on receiving the command;
        transmit, to the volatile memory device, a read command that includes a logical address of the volatile memory device that is associated with the LBA of data stored in the non-volatile memory device based at least in part on determining whether the compressed copy of the data is stored in the volatile memory device; and
        receive, at the host system from the volatile memory device, the compressed copy stored at the logical address of the volatile memory device of the data additionally stored in the non-volatile memory device.

2. The apparatus of claim 1, wherein the controller is further configured to cause the apparatus to:
    decompress the compressed copy of the data stored in the volatile memory device based at least in part on receiving the compressed copy of the data stored in the volatile memory device.

3. The apparatus of claim 1, wherein the controller is further configured to cause the apparatus to:
    identify that the compressed copy of the data is stored in the volatile memory device, wherein transmitting the read command to the volatile memory device is based at least in part on identifying that the compressed copy of the data is stored in the volatile memory device.

4. The apparatus of claim 1, wherein the controller is further configured to cause the apparatus to:
    assign a score to the data based at least in part on an access frequency parameter associated with the data;
    compress a copy of the data stored in the non-volatile memory device based at least in part on the score satisfying a threshold score; and
    store, in the volatile memory device, the compressed copy of the data stored in the non-volatile memory device based at least in part on the score satisfying the threshold score, wherein receiving the compressed copy of the data stored in the volatile memory device is based at least in part on storing the compressed copy of the data.

5. The apparatus of claim 4, wherein the controller is further configured to cause the apparatus to:
    retrieve the data from the non-volatile memory device based at least in part on the score exceeding the threshold score; and
    compress the data to generate the compressed copy of the data based at least in part on retrieving the data, wherein storing the compressed copy of the data is based at least in part on compressing the data.

6. The apparatus of claim 4, wherein the access frequency parameter comprises an indication of a likelihood that the data is accessed, a frequency that the data is accessed, or a combination thereof.

7. The apparatus of claim 1, wherein the controller is further configured to cause the apparatus to:
    identify a score associated with the data stored in the non-volatile memory device based at least in part on an access frequency parameter associated with the data; and
    delete the compressed copy of the data stored in the volatile memory device based at least part on the score being less than a threshold score.

8. The apparatus of claim 1, wherein the controller is further configured to cause the apparatus to:
    transmit, from the host system, a write command that includes a second LBA to store second data in the non-volatile memory device; and
    store a compressed copy of the second data in the volatile memory device by overwriting at least a portion of the compressed copy of the data with at least a portion of the compressed copy of the second data based at least in part on transmitting the write command.

9. The apparatus of claim 1, wherein the controller is further configured to cause the apparatus to:
    update a score associated with the data based at least in part on receiving the read command.

10. The apparatus of claim 1, wherein the controller is further configured to cause the apparatus to:
 allocate a portion of the volatile memory device to store compressed copies of data stored in the non-volatile memory device, the portion of the volatile memory device configured to provide lower-latency access to the compressed copies of data relative to accessing information in the non-volatile memory device, wherein receiving the compressed copy of the data stored in the volatile memory device is based at least in part on allocating the portion.

11. The apparatus of claim 10, wherein the controller is further configured to cause the apparatus to:
 determine that a threshold amount of memory of a second portion of the volatile memory device used to store uncompressed data is used; and
 reallocate at least a part of the portion of the volatile memory device to the second portion based at least in part on determining that the threshold amount of memory is used.

12. The apparatus of claim 1, wherein the controller is further configured to cause the apparatus to:
 identify that a compressed copy of second data stored in the non-volatile memory device is not stored in the volatile memory device;
 transmit, to the non-volatile memory device, a second read command that includes a second logical address that is associated with a second LBA of the second data; and
 receive the second data from the non-volatile memory device based at least in part on transmitting the second read command to the non-volatile memory device.

13. The apparatus of claim 1, wherein the controller is further configured to cause the apparatus to:
 evict the compressed copy of the data from the volatile memory device based at least in part on a score associated with the data stored in the non-volatile memory device being less than a threshold score; and
 store the compressed copy of the data in the non-volatile memory device based at least in part on evicting the compressed copy of the data from the volatile memory device.

14. The apparatus of claim 13, wherein the controller is further configured to cause the apparatus to:
 identify that the compressed copy of the data is not stored in the volatile memory device based at least in part on evicting the compressed copy of the data from the volatile memory device;
 transmit, to the non-volatile memory device, a second read command that includes the logical address that is associated with the LBA of the data stored in the non-volatile memory device; and
 receive the compressed copy of the data stored in the non-volatile memory device based at least in part on storing the compressed copy of the data in the non-volatile memory device.

15. The apparatus of claim 1, wherein the volatile memory device comprises:
 a first portion of random access memory cells configured to store uncompressed data of any data type;
 a second portion of random access memory cells configured to store compressed data of a first type of data; and
 a third portion of random access memory cells configured to store compressed copies of host data stored by the non-volatile memory device, wherein the compressed copy of the data is stored in the third portion.

16. The apparatus of claim 1, wherein the non-volatile memory device comprises not-and (NAND) memory cells, and the volatile memory device comprises random access memory cells.

17. A non-transitory computer-readable medium storing code comprising instructions which, when executed by a processor of an electronic device, cause the electronic device to:
 receive a command to access data stored in a non-volatile memory device;
 determine, by a host system coupled with the non-volatile memory device and a volatile memory device, whether a compressed copy of the data is additionally stored in the volatile memory device, the compressed copy of data associated with a logical block address (LBA) of the non-volatile memory device based at least in part on receiving the command;
 transmit, from the host system to the volatile memory device coupled with the host system, a read command that includes logical address of the volatile memory device that is associated with the LBA of data stored in the non-volatile memory device coupled with the host system based at least in part on determining whether the compressed copy of the data is stored in the volatile memory device; and
 receive, at the host system from the volatile memory device, the compressed copy associated with the LBA stored in the volatile memory device of the data stored in the non-volatile memory device.

18. The non-transitory computer-readable medium of claim 17, wherein the instructions, when executed by the processor of the electronic device, further cause the electronic device to:
 identify that the compressed copy of the data is stored in the volatile memory device, wherein transmitting the read command to the volatile memory device is based at least in part on identifying that the compressed copy of the data is stored in the volatile memory device.

19. The non-transitory computer-readable medium of claim 17, wherein the instructions, when executed by the processor of the electronic device, further cause the electronic device to:
 assign a score to the data based at least in part on an access frequency parameter associated with the data;
 compress a copy of the data stored in the non-volatile memory device based at least in part on the score satisfying a threshold score; and
 store, in the volatile memory device, the compressed copy of the data stored in the non-volatile memory device based at least in part on the score satisfying the threshold score, wherein identifying that the compressed copy of the data is stored in the volatile memory device is based at least in part on storing the compressed copy of the data.

20. The non-transitory computer-readable medium of claim 19, wherein the instructions, when executed by the processor of the electronic device, further cause the electronic device to:
 retrieve the data from the non-volatile memory device based at least in part on the score exceeding the threshold score; and
 compress the data to generate the compressed copy of the data based at least in part on retrieving the data, wherein storing the compressed copy of the data is based at least in part on compressing the data.

21. The non-transitory computer-readable medium of claim 19, wherein the access frequency parameter comprises an indication of a likelihood that the data is accessed, a frequency that the data is accessed, or a combination thereof.

22. A method performed by a host system coupled with a non-volatile memory device and a volatile memory device, comprising:
  receiving a command to access data stored in the non-volatile memory device;
  determining whether a compressed copy of the data is additionally stored in the volatile memory device, the compressed copy of data associated with a logical block address (LBA) of the non-volatile memory device based at least in part on receiving the command;
  transmitting, to the volatile memory device coupled with the host system, a read command that includes a logical address of the volatile memory device that is associated with the LBA of data stored in the non-volatile memory device coupled with the host system based at least in part on determining whether the compressed copy of the data is stored in the volatile memory device; and
  receiving, from the volatile memory device, the compressed copy associated with the LBA stored in the volatile memory device of the data stored in the non-volatile memory device.

23. The method of claim 22, further comprising:
  identifying that the compressed copy of the data is stored in the volatile memory device, wherein transmitting the read command to the volatile memory device is based at least in part on identifying that the compressed copy of the data is stored in the volatile memory device.

24. The method of claim 22, further comprising:
  assigning a score to the data based at least in part on an access frequency parameter associated with the data;
  compress a copy of the data stored in the non-volatile memory device based at least in part on the score satisfying a threshold score; and
  storing, in the volatile memory device, the compressed copy of the data stored in the non-volatile memory device based at least in part on the score satisfying the threshold score, wherein identifying that the compressed copy of the data is stored in the volatile memory device is based at least in part on storing the compressed copy of the data.

25. The method of claim 24, further comprising:
  retrieving the data from the non-volatile memory device based at least in part on the score exceeding the threshold score; and
  compressing the data to generate the compressed copy of the data based at least in part on retrieving the data, wherein storing the compressed copy of the data is based at least in part on compressing the data.

* * * * *